United States Patent [19]

Grape et al.

[11] Patent Number: 4,582,874
[45] Date of Patent: Apr. 15, 1986

[54] SILICONE RESIN EMULSION

[75] Inventors: Wolfgang Grape, Cologne; Ottfried Schlak; Helmut Steinberger, both of Leverkusen; Hermann Kober, Bergisch-Gladbach, all of Fed. Rep. of Germany

[73] Assignee: Bayer Aktiengesellschaft, Leverkusen, Fed. Rep. of Germany

[21] Appl. No.: 622,945

[22] Filed: Jun. 21, 1984

[30] Foreign Application Priority Data

Jul. 2, 1983 [DE] Fed. Rep. of Germany ....... 3323908

[51] Int. Cl.$^4$ .................. C08L 83/06; C08F 11/04
[52] U.S. Cl. ................................. 524/588; 524/313; 524/312
[58] Field of Search .................. 524/588, 313, 312

[56] References Cited

U.S. PATENT DOCUMENTS 3,668,180 6/1972 Brennan et al. ................. 528/14
4,476,282 10/1984 Koerner et al. ................. 524/588

FOREIGN PATENT DOCUMENTS 0049365 4/1982 European Pat. Off. .
0089784 9/1983 European Pat. Off. .
1069057 11/1959 Fed. Rep. of Germany .
2330887 1/1975 Fed. Rep. of Germany .

Primary Examiner—John Kight
Assistant Examiner—M. L. Moore
Attorney, Agent, or Firm—Sprung Horn Kramer & Woods

[57] ABSTRACT

An aqueous emulsion, having a long shelf life, of a low molecular weight silicone resin comprising by weight
(a) 1–60% of a silicone resin of the formula

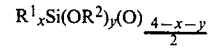

wherein
  $R^1$ is a monovalent hydrocarbon radical having 1–14C atoms,
  $R^2$ is a monovalent hydrocarbon radical having 1–18C atoms,
  x has a value from about 0.75 to 1.5 and
  y has a value from about 0.2 to 2.0,
and having a viscosity of about 2 to 2000 mPa.s,
(b) 0.1–10% of an emulsifier, and
(c) water.

Advantageously two non-ionic emulsifiers are used in combination.

8 Claims, No Drawings

SILICONE RESIN EMULSION

The present invention relates to stable aqueous emulsions of low molecular weight silicone resins which possess alkoxy functional groups, can be used for impregnation and coating applications, and are particularly preferably used for those applications where organic solvents are undesirable because of their toxicological properties and their fire risk. The invention furthermore relates to a process for the preparation of such emulsions.

Silicone resin emulsions are in themselves known (see, for example, DE-OS (German Published Specification) No. 3,200,709). They can be employed in a variety of ways, and, because of their outstanding properties, have proved very useful for a large number of applications. Fields of use are, for example, adhesives, separating coatings, surface-coating additives and colorant formulations.

However, the known silicone resin emulsions are in some respects in need of improvement. Thus, the depth of penetration for impregnations (for example in the building sector) leaves something to be desired in many cases. Frequently, the hardening of the silicone resins and the bonding with other resins are also not completely satisfactory. It was therefore an object of the present invention to provide silicone resin emulsions which can be used even more universally.

The present invention therefore relates to aqueous emulsions, having a long shelf life, of low molecular weight silicone resins which possess alkoxy functional groups, containing
(a) 1–60% by weight of a silicone resin of the general formula

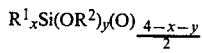

wherein
R$^1$ represents a monovalent hydrocarbon radical having 1–14 C atoms,
R$^2$ represents a monovalent hydrocarbon radical having 1–18 C atoms,
x has a value of 0.75 to 1.5 and
y has a value of 0.2 to 2.0,
and with a viscosity of 2 to 2000 mpa.s,
(b) 0.5–10% by weight of an emulsifier and
(c) water.

In contrast to silicone resin emulsions described earlier, such as those also disclosed in, for example, DE-OS (German Published Specification) No. 3,200,709, the formulations according to the invention are emulsions of low molecular weight silicone resin possessing alkoxy functional groups. Such silicone resins possessing alkoxy functional groups are in general very sensitive to hydrolysis, and furthermore they tend to gel in the presence of water.

Surprisingly, it has now been found that, in spite of the large number of reactive groups in the low molecular weight silicone resins, stable emulsions can be prepared from these resins possessing alkoxy functional groups. Furthermore, it is surprising that, in spite of the large amounts of water present during the emulsification process, it is not possible to detect any relatively large amounts of alcohol formed by hydrolysis. Relatively small amounts of alcohol formed in this way are in no way troublesome; on the contrary, they can even contribute to increasing the stability of the emulsions according to the invention.

The emulsions, according to the invention, of low molecular weight silicone resins possessing alkoxy functional groups contain, in addition to water, the following components:

1–60% by weight, preferably 20–50%, of a low molecular weight silicone resin which possesses alkoxy functional groups, has a viscosity of 2 to 2000 mPa.s, preferably 20 to 200 mPa.s, and has a composition of the general formula

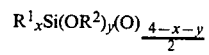

wherein
R$^1$ is a monovalent hydrocarbon radical having 1 to 14 C atoms, and is preferably the methyl radical, and wherein
R$^2$ is a monovalent hydrocarbon radical having 1 to 18 C atoms and is preferably the methyl radical, and wherein
x has a value of 0.75 to 1.5, and
x is preferably about 1,
and wherein
y has a value of 0.2 to 2, preferably 0.4 to 1.2.

The emulsifier component consists in general of 0.5 to 10% of a combination of emulsifier, and pure non-ionic emulsifiers as well as a combination of a non-ionic emulsifier with either an anionic or a cationic emulsifier are used.

Furthermore, it is also possible to employ 0 to 3% of a further emulsifying assistant, in particular an emulsifying assistant which has a thickening action, preferably an emulsifying assistant based on cellulose.

Moreover, the emulsion consisting of these components should have a long shelf life. The term "long shelf life" means that the emulsion can be stored for at least three months without separation or gelling.

In the silicone resin sector, resins of this type are usually prepared in solvents. Hence, depending on the manner of its preparation, the low molecular weight resin employed, which possesses alkoxy functional groups, can also contain organic solvents, but the amount of solvent should not exceed 20%, based on the amount of the silicone resin. Possible solvents for such resins are toluene, xylene or hydrocarbons, for example benzine fractions. These organic solvents in no way have an adverse effect on the properties (for example the stability) of the emulsion; however, they are undesirable in many cases. The preferred embodiment of the emulsification according to the invention is that in which no organic solvent is contained in the emulsion; that is to say, the organic solvent is removed beforehand.

It is furthermore advantageous to add to the emulsion according to the invention an agent which promotes subsequent adhesion to a substrate or subsequent hardening, eg. alkyl-tin salts. Thus, according to the preferred embodiment, the emulsion according to the invention can, directly after the preparation, be mixed with an emulsion of an alkyl-tin salt. However, it is also possible to add the addition of an emulsion of curing agent only directly before the desired use.

Examples of suitable additives of this type are the known alkyl-tin salts, such as, for example, dibutyl-tin dilaurate, dialkyl-tin stearate, dialkyl-tin octoate and others.

The preparation of the silicone resins which possess alkoxy functional groups and are employed according to the invention is known, and is carried out by reacting alkyl- and/or arylchlorosilanes with alcohol and water (see for example British Patent Specification No. 685,173, German Patent Specification No. 958,702, French Patent Specification No. 1,475,709, Specification U.S. Pat. No. 3,668,180, DE-AS (German Published Specification) No. 2,061,180, DE-OS (German Published Specification) No. 2,444,529, DE-AS (German Published Specification) No. 2,532,887, EPI-PC No. 3610 and DE-OS (German Published Specification) No. 3,000,782).

The methyl-methoxy-silicone resin which is particularly preferred according to the invention is prepared by reacting methyltrichlorosilanes with methanol and water. If desired, mixtures of methyltrichlorosilane and other alkyl- and/or arylchlorosilanes and/or tetrachlorosilane can also be used for the preparation of the silicone resins possessing alkoxy functional groups, without the stability of the emulsion according to the invention suffering as a result. It is also possible to use mixtures of various alcohols for the preparation of the resins, and/or to mix together various silicone resins possessing alkoxy functional groups, without the stability of the emulsion according to the invention being adversely affected as a result. However, because of the spectrum of properties and the cost-efficiency, the use of methyltrichlorosilane and methanol is preferred for the preparation of the silicone resin possessing alkoxy functional groups. Furthermore, it is possible to add to the silicone resin small amounts of agents which promote subsequent adhesion to a substrate or subsequent hardening of the silicone resin on the substrate. However, such agents are preferably added in the form of a separately prepared emulsion or dispersion, or dissolved in the water of the emulsion according to the invention.

The water-based emulsions of the silicone resins described above are prepared by using a combination of emulsifiers. A combination of two non-ionic emulsifiers is preferably employed. Such emulsifiers are polyoxyethylene derivatives of fatty alcohols, for example POE(4)-lauryl alcohol, POE(10)-cethyl alcohol, POE(20)-stearyl alcohol, POE(2)-oleyl alcohol, POE(20)-oleyl alcohol and others, polyoxyethylene derivatives of fatty acids, for example POE laurate, POE stearate, POE oleate and others, polyoxyethylene sorbitane fatty acid esters, for example POE(20) sorbitane monolaurate, POE(20) monopalmitate, POE(4) monostearate, POE(20) sorbitane tristearate, POE(5) sorbitane monooleate and others, polyoxyethylene derivatives of polyhydric alcohols, for example POE triglyceride, polyoxyethylene derivatives of nonylphenol, for example POE(10)-nonylphenol, POE(20)-nonylphenol and others, sorbitane fatty acid esters, for example sorbitane monolaurate, sorbitane monostearate, sorbitane tristearate and others, and others of the same type.

The amount of emulsifiers which is required for the emulsification of portions of 100 parts by weight of resin solids will vary within a wide range, depending on the process conditions and the choice of the remaining components of the emulsion. In the preparation, according to the invention, of the emulsions of low molecular weight silicone resins possessing alkoxy functional groups, the amount of emulsifiers which is required depends primarily on the content of alkoxy groups in the silicone resin possessing alkoxy functional groups. However, an amount of emulsifier of 10 parts by weight, based on 100 parts by weight of silicone resin, is in general sufficient for the preparation of an emulsion, having a long shelf life, of a low molecular weight silicone resin possessing alkoxy functional groups. The use of a combination of non-ionic emulsifiers is particularly preferred; in particular, stable emulsions of low molecular weight silicone resins possessing alkoxy functional groups are prepared using a combination of the non-ionic emulsifiers POE(40)-triglyceride/POE(2)-oleyl alcohol or a combination of the non-ionic emulsifiers POE(40)-triglyceride/POE(6)-tridecyl alcohol. However, other combinations of non-ionic emulsifiers can also be employed. These non-ionic emulsifiers are familiar in principle to one skilled in the art (see, for example, Stache, Tensidtaschenbuch (Surfactant Notebook), Hanser Verlag; McCutchen's Detergents & Emulsifiers, North American Edition, 1979).

It is furthermore possible to replace one of the two non-ionic emulsifiers employed by either a cationic or an anionic emulsifier, and hence to use a combination of a non-ionic emulsifier with a cationic or an anionic emulsifier.

All the emulsifying assistants which are familiar to one skilled in the art can be employed as emulsifying assistants. Particularly preferred emulsifying assistants are those which have a thickening action, and among these, in particular, the sodium salt of carboxymethylcellulose. However, other emulsifying assistants, such as, for example, relatively long-chain alcohols, polyvinyl alcohols, urea, etc., can also be used. The addition of an emulsifying assistant in the manner described is particularly preferred for the emulsification of a low molecular weight silicone resin which possesses alkoxy functional groups and has a high alkoxy content and a low viscosity.

The methods (see, for example, E. Manegold, Emulsionen (Emulsions); P. Becker, Emulsions, Theory & Practice, New York 1965, Chapter 7) for the preparation of emulsions are likewise familiar in principle to one skilled in the art. The sequence of the addition of the components is in general not critical. Because the low molecular weight silicone resins possessing alkoxy functional groups are sensitive to hydrolysis, in the case of the emulsification of such resins those methods are preferred in which an aqueous solution containing the emulsifiers and emulsifying assistants is initially introduced, and the resin possessing alkoxy functional groups is introduced into this solution. The use of mechanical emulsifying aids may also be desirable. Such mechanical emulsifying aids include, for example, high-speed stirrers (Ultraturrax) as well as pressurised emulsifying machines and colloid mills.

The silicone resin emulsions according to the invention are principally employed for impregnating and coating cellulose material or inorganic oxidic materials (for example masonry). They are suitable for rendering mineral-based deadening and insulating materials hydrophobic, and are used as water-repellent binders in coloured dispersion paints.

The examples which follow are intended to illustrate the subject of the present invention in more detail (%ages relate to % by weight, unless stated otherwise).

EXAMPLES

Example 1

Preparation of a methylmethoxy resin

10 mol of methanol are mixed with 5.5 mol of water, and the mixture is slowly added dropwise, at an initial temperature of 30° C., using a dropping funnel, to a mixture of 6 mol of methyltrichlorosilane and 400 g of xylene, which is stirred intensively in a three-necked flask. Gaseous HCl escapes through the attached condenser. The reaction mixture undergoes substantial cooling. After the addition of the aqueous methanol solution, the reaction mixture is heated to 40° C., and a mixture of methanol and HCl is distilled off in vacuo. Residual HCl is neutralised with anhydrous sodium carbonate, and the solvent is then distilled off under 30 mbar at a bottom temperature of up to 135° C. After cooling and filtration, a clear colourless liquid having a viscosity of 50 mPa.s at 23° C. is obtained. The composition of the methyl-methoxy-silicone resin prepared in this manner corresponds to the empirical formula $CH_3Si(O)_{1.1}(OCH_3)_{0.8}$.

Example 2

Emulsification of the methyl-methoxy-silicone resin prepared as described under 1

Batch for 100 kg of emulsion:
40 kg of methylmethoxy resin
3.2 kg of polyoxyethylene triglyceride
0.8 kg of oleyl alcohol with 2 ethylene oxide units
56 kg of water.

Preparation of the emulsion:

Water is initially introduced, and is heated to 60° C. while stirring. Molten polyoxyethylene triglyceride is added. The mixture is stirred for 15 minutes. It is allowed to cool to 40° C., oleyl alcohol with 2 ethylene oxide units is added, and stirring is continued for 5 minutes. Thereafter, the resin prepared in Example 1 is added in the course of half an hour, stirring is continued for 20 minutes using a Kotthoff stirrer, and the mixture is passed 4 times through a high-pressure homogenising machine.

The emulsion thus prepared is stable for more than 6 months, in spite of the high alkoxy content of the low molecular weight silicone resin possessing alkoxy functional groups.

Example 3

A silicone resin emulsion having a silicone content of 40%, according to Example 2, was diluted with water in a ratio of 1:10.

Dry samples of building material having the dimensions 50×50×15 mm were treated with this emulsion by immersion. The immersion time was 10 seconds. The samples prepared in this manner were dried for 7 days at room temperature and then for 3 days at 50° C.

The capillary water uptake, in % by weight, as a result of storage of the samples in cold water at a depth of approx. 3 mm was determined.

The following results were obtained:

| Building material | Water uptake, % by weight | | |
|---|---|---|---|
| | 2 hours | 6 hours | 24 hours |
| Cement mortar Sand/cement: 1:3 untreated | 6.5 | 6.9 | 6.9 |
| Cement mortar impregnated | 1.1 | 1.3 | 2.2 |
| Limestone sand untreated | 9.0 | 9.3 | 9.4 |
| Limestone sand impregnated | 1.2 | 2.5 | 5.2 |
| Brick untreated | 8.1 | 8.4 | 9.3 |
| Brick impregnated | 0.9 | 1.0 | 1.4 |
| Cement-lime plaster, 8 parts of sand, 2 parts of limestone, 1 part of cement | 10.9 | 10.9 | 11.0 |
| Cement-lime plaster, 8 parts of sand, 2 parts of limestone, 1 part of cement, impregnated | 1.5 | 1.7 | 1.8 |

It will be appreciated that the instant specification and examples are set forth by way of illustration and not limitation, and that various modifications and changes may be made without departing from the spirit and scope of the present invention.

We claim:

1. An aqueous emulsion, having a long shelf life, of a low molecular weight silicone resin by weight consisting essentially of
(a) 1–60% of a silicone resin of the formula $$R^1{}_xSi(OR^2)_y(O)_{\frac{4-x-y}{2}}$$

wherein
$R^1$ is a monovalent hydrocarbon radical having 1–14 C atoms,
$R^2$ is a monovalent hydrocarbon radical having 1–18 C atoms,
x has a value from about 0.75 to 1.5 and
y has a value from about 0.2 to 2.0,
and having a viscosity of about 2 to 2000 mPa.s,
(b) 0.1–10% of an emulsifier, and
(c) water.

2. An emulsion according to claim 1, in which (a) is present in about 20 to 50% by weight and has a viscosity of about 20 to 200 mPa.s and (b) is present in about 0.5 to 10% by weight.

3. An emulsion according to claim 1, in which
$R^1$ is methyl,
$R^2$ is methyl,
x is about 1, and
y is about 0.4 to 1.2.

4. An emulsion according to claim 1, wherein the emulsifier (b) comprises a combination of at least two non-ionic emulsifiers.

5. An emulsion according to claim 2, which (b) is a combination of POE(40)-triglyceride with POE(2)-oleyl alcohol and/or POE(6)-tridecyl alcohol.

6. An emulsion according to claim 2, in which
$R^1$ is methyl,
$R^2$ is methyl,
x is about 1, and
y is about 0.4 to 1.2,
and (b) is a combination of POE(40)-triglyceride with POE(2)-oleyl alcohol and/or POE(6)-tricecyl alcohol.

7. In the coating or impregnation of a material with an aqueous silicone emulsion followed by drying, the improvement which comprises employing as the emulsion an aqueous emulsion according to claim 1.

8. In the rendering of a mineral-based material hydrophobic by applying thereto an aqueous silicone emulsion followed by drying, the improvement which comprises employing as the emulsion an aqueous emulsion according to claim 1.

* * * * *